United States Patent
Sakurai

(10) Patent No.: US 7,031,019 B1
(45) Date of Patent: Apr. 18, 2006

(54) PRINTER CONTROL APPARATUS, PRINTER AND PRINTING SYSTEM

(75) Inventor: Mitsuo Sakurai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/206,971

(22) Filed: Dec. 8, 1998

(30) Foreign Application Priority Data

Mar. 4, 1998 (JP) .................................. 10-052135

(51) Int. Cl.
G06F 15/00 (2006.01)
G06K 15/00 (2006.01)
H04N 1/405 (2006.01)

(52) U.S. Cl. ........................ 358/1.9; 358/3.06; 358/534

(58) Field of Classification Search .......... 358/1.1–1.9, 358/1.11–1.18, 2.1, 3, 3.01, 3.02, 3.03, 3.05, 358/3.06, 3.13, 3.14, 3.16, 3.19, 3.2, 534
See application file for complete search history.

(56) References Cited

U.S. PATENT DOCUMENTS

| | | | | |
|---|---|---|---|---|
| 4,189,775 A | * | 2/1980 | Inouye et al. .................. | 378/11 |
| 4,682,190 A | | 7/1987 | Ikeda | |
| 4,857,904 A | * | 8/1989 | Schoon ........................ | 340/730 |
| 5,731,823 A | * | 3/1998 | Miller et al. ................... | 347/5 |
| 6,304,335 B1 | * | 10/2001 | Furuya et al. ............. | 358/1.15 |
| 6,351,320 B1 | * | 2/2002 | Shin ............................ | 358/1.9 |

FOREIGN PATENT DOCUMENTS

| | | |
|---|---|---|
| DE | 40 41 054 A1 | 7/1991 |
| DE | 195 25 177 C1 | 11/1996 |
| EP | 0 269 746 A1 | 6/1988 |
| EP | 0 397 428 A2 | 11/1990 |
| EP | 0 429 283 A2 | 5/1991 |
| JP | 07-030695 | 3/1995 |
| JP | 09-252413 | 9/1997 |

* cited by examiner

*Primary Examiner*—King Y. Poon
(74) *Attorney, Agent, or Firm*—Sughrue Mion, PLLC

(57) ABSTRACT

To provide high-speed printing with an inexpensive arrangement, a dedicated printer control hardware circuit 5 is provided between a printer driver 1 of a host computer and a printer 9. The printer driver 1 divides an image to be printed into an illustration (a natural image), such as a photograph or a drawing, and characters/graphics. The printer driver outputs full-color RGB raster data for the illustration, while performing color conversion/halftoning for the character/graphic data and outputting binary CMYK raster data. The control circuit 5 performs color conversion/halftoning for the full-color illustration RGB raster data to convert them into binary CMYK raster data. Then, the control circuit 5 superimposes the obtained binary CMYK raster data and the binary CMYK raster data for characters/graphics to form binary CMYK raster data for a complete print image, and transmits the final binary CMYK raster data to the printer 9. The control circuit 5 also rearranges or thins pixel data for interlace printing or overlap printing.

27 Claims, 7 Drawing Sheets

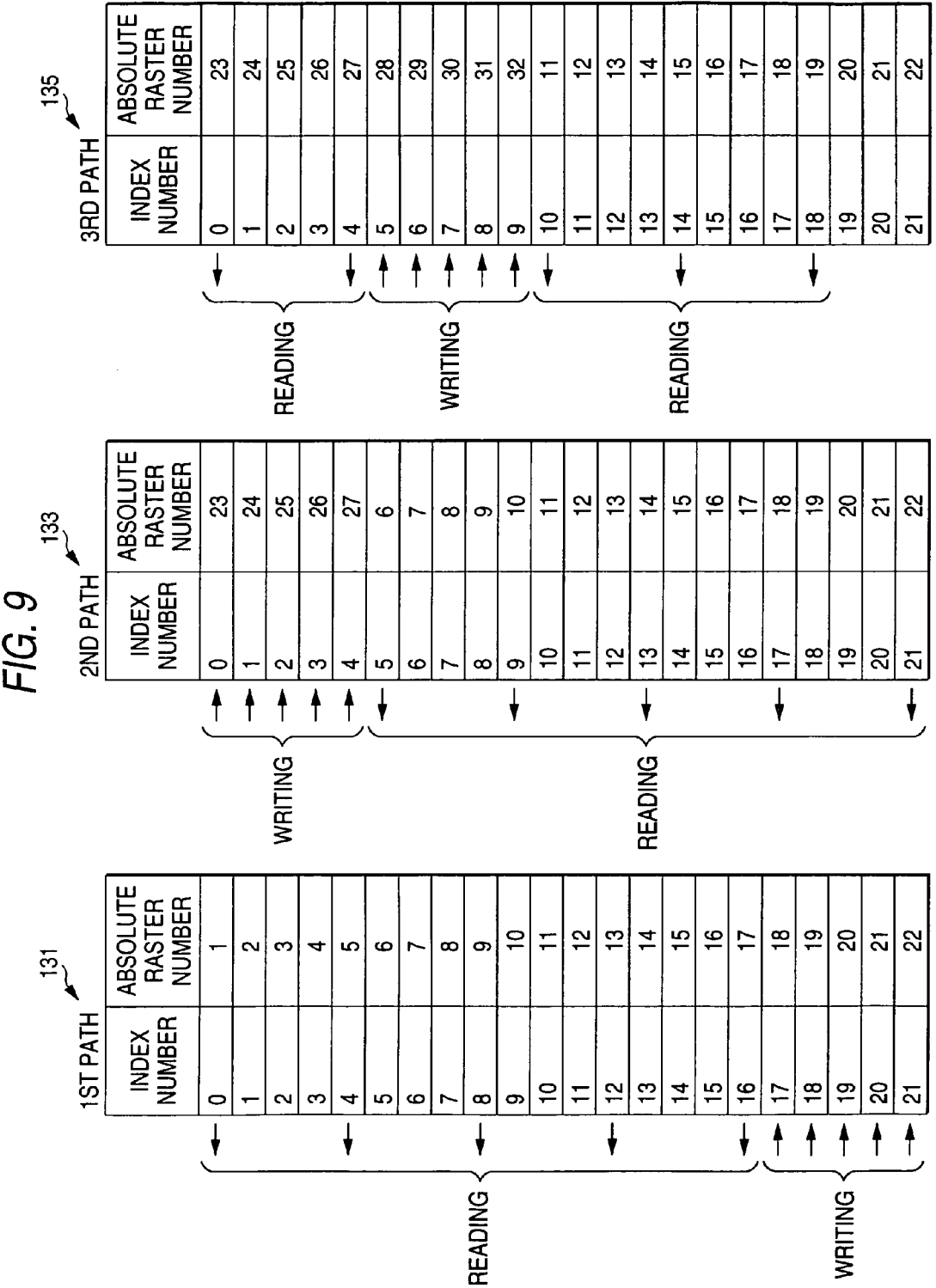

PRINTER CONTROL APPARATUS, PRINTER AND PRINTING SYSTEM

BACKGROUND OF THE INVENTION

1. Field of the Invention

The present invention relates to a printer control technique for high-speed printing.

A printer employed for a computer system, etc., employs coloring agents for a limited number of colors, such as CMY or CMYK, and forms or does not form small individually colored dots at locations on paper that correspond to pixels (for some printer models, the sizes of dots are further changed at a plurality of levels), thereby providing a pseudo-continuous tone image that appears, to the eyes of a viewer, to be a continuous tone image. Normally, final image data that are required by a printer are CMYK raster data that determine whether dots for CMYK coloring agents should or should not be formed at locations corresponding to individual pixel positions (for some printer models, the size of a dot is designated at one of a plurality of levels). Since the CMYK raster data have only two or slightly more levels of resolutions for the individual color components, in this specification such raster data are called "low-resolution" CMYK raster data.

Original image data, which are generated or are externally entered with an application used by a host computer that issues print commands to a printer, are normally high-resolution RGB data, which are represented by a host display color system that differs from a printer display color system, that specifically use an RGB display system, and for which high resolution levels, such as 256 levels, are provided for the individual color components. The original image data may be low-level data (raster data) that are represented as a set of pixel values, or they may be high-level data that are represented by a graphic function or character codes.

2. Description of the Related Art

In a conventional printing system, a printer driver, which is software that is provided for a host computer, or imaging software, which is provided for a printer, converts high-resolution RGB data for an original image into the final low-resolution CMYK data. This conversion process includes "rasterization," for converting high-level original image data to raster data, "color conversion," for employing a lookup table to convert RGB pixel values to CMY or CMYK pixel values, and "halftoning," for employing error diffusion or dithering to convert high-resolution pixel values to low-resolution pixel values. For an ink-jet printer, in order to improve the image quality a so-called "interlaced" printing method, or an "overlapping" printing method, is employed whereby dots are formed in an order differing from the pixel arrangement order. The rearrangement of pixels is also performed during the above conversion process.

The above described conversion process constitutes a large load for the CPU of a host computer when the process is controlled using the printer driver, or for the CPU of a printer when control is provided by the printer. Therefore, an extended period of time is required for this processing; it is the major factor affecting the printing speed. In order to provide high-speed printing, a high-speed and high-performance CPU is mounted in a printer, such as a laser printer, to perform the above described conversion process at the printer. However, as a result the price of the laser printer is quite high. On the contrary, with an ink-jet printer, in order to reduce the price of the printer, the above conversion process is performed by a printer driver at a host computer that controls the entire process. But in this case, the printing speed attained by the ink-jet printer is fairly slow, and the length of time that the host computer is occupied is so long that other jobs can not be performed on the host side.

SUMMARY OF THE INVENTION

One objective of the present invention is to provide high-speed printing for which only inexpensive equipment is required.

Another objective of the present invention is to provide high-speed printing without imposing a large load on the CPU of a host computer in an environment wherein a low-speed printer, such as a conventional ink-jet printer, is employed.

An additional objective of the present invention is to provide an inexpensive printer that can perform high-speed printing.

According to the present invention, a dedicated printer control hardware circuit is provided between an upper apparatus, such as a host computer, and a printer. The dedicated hardware circuit may be incorporated in the upper apparatus or in the printer, or may be externally attached to these two. The dedicated hardware circuit receives from the upper apparatus high-resolution raster data for the first image element and low-resolution raster data for the second image element, performs a halftoning process for the high-resolution raster data of the first element to convert them into low-resolution raster data, employs the obtained low-resolution raster data and the low-resolution raster data for the second element to acquire low-resolution raster data for a complete print image, and transmits to a printer the low-resolution raster data that is finally obtained.

According to the present invention, since the dedicated hardware circuit performs the halftoning process for the first image element and generates a complete image, the upper apparatus does not need to perform the halftoning process for the first image element, and since the printer does not need to perform any halftoning process, high-speed printing is ensured. As the dedicated hardware circuit is provided using an ASIC (Application Specified IC), it costs less than a conventional high-speed printing system in which a fast CPU is mounted.

In the preferred embodiment, the first image element is an illustration (a natural image), such as a photograph or a drawing, and the second image element is a character or a graphic. As for an illustration, high-resolution raster data of the display color type for the upper apparatus (e.g., full color RGB raster data) are transmitted from the upper apparatus to the dedicated hardware circuit. A color conversion and halftoning process is performed for the raster data by the dedicated hardware circuit to change them into low-resolution raster data of the printer color display type (e.g., binary CMYK raster data). As for characters and graphics, low-resolution raster data of the printer display color type (e.g., binary or multilevel color RGB raster data) are transmitted from the upper apparatus to the dedicated hardware circuit. In this embodiment, since the upper apparatus (specifically a host computer) need only perform color conversion and halftoning for characters or for graphics, which is a comparatively light-load process, and since the dedicated hardware circuit performs color conversion and halftoning for an illustration, which is a comparatively heavy-load process, high-speed printing is ensured. Generally, high resolution is required for an illustration in order to obtain a clear outline for a character or a graphic. In this embodiment, however, since the data for characters and for graphics are converted into low-resolution raster data by the upper apparatus, and the obtained raster data are transmitted to the dedicated hardware circuit, the quantity of data to be transmitted is not increased even though the data have a high resolution, and this fact also contributes to high-speed printing.

In addition, in the preferred embodiment, since for interlaced printing the dedicated hardware circuit changes the pixel order, this also contributes to high-speed printing.

Furthermore, in the preferred embodiment, the dedicated hardware circuit includes a memory, and writes therein the memory raster data for an illustration and the raster data for a character or a graphic, while at the same time superimposing these data, so as to provide raster data for a complete print image in the memory. Since the memory is employed in this manner, only a simple structure is required for the superimposition of the illustration and the characters/graphics, and this contributes to a reduction in the price.

Further, since the writing either of the illustration data or of the character/graphic data is performed while the other data are being written, a common circuit can be used to write illustration data and character/graphic data, and this also contributes to a reduction in the price.

Moreover, in the preferred embodiment, the upper apparatus sequentially transmits, for each raster, raster data for an illustration and raster data for characters/graphics. When the dedicated hardware circuit ascertains that the end of the raster has been reached, both for the illustration and for the characters/graphics, it increments a vertical address to designate a location in the memory at which to write the raster. Therefore, a simpler circuit is provided for the superimposing and the writing of the photo raster data and the character/graphic raster data for the same raster, and this also contributes to a reduction in the price.

In the preferred embodiment, as for a raster where an illustration or characters/graphics do not exist, a raster end command is transmitted from the upper apparatus to designate the end of the raster, even for an image element that does not exist in the raster. Therefore, upon receiving the raster end command, the dedicated hardware circuit can identify the end of the raster for the image element that does not exist and can increment the vertical address. As a result, for the image element that does not exist, the writing of null data to the memory can be performed without the actual writing being carried out, and this can also contribute to high-speed processing.

In the preferred embodiment, the memory in the dedicated hardware circuit is employed as a ring buffer. While the print head of the printer is reading raster data from the memory for a raster that is required for the current path (the main scanning), raster data are written in the memory up to the last raster that the print head requires for the next path. The storage capacity provided for the storing of raster data in a memory can be the smallest that is needed for the storage of an amount of raster data that is equivalent to the data available in a range wherein the print head covers two paths. This also contributes to a reduction in cost.

BRIEF DESCRIPTION OF THE DRAWINGS

FIG. 9 is a diagram showing the writing/reading of raster data from a memory.

DESCRIPTION OF THE PREFERRED EMBODIMENTS

Figure 1:
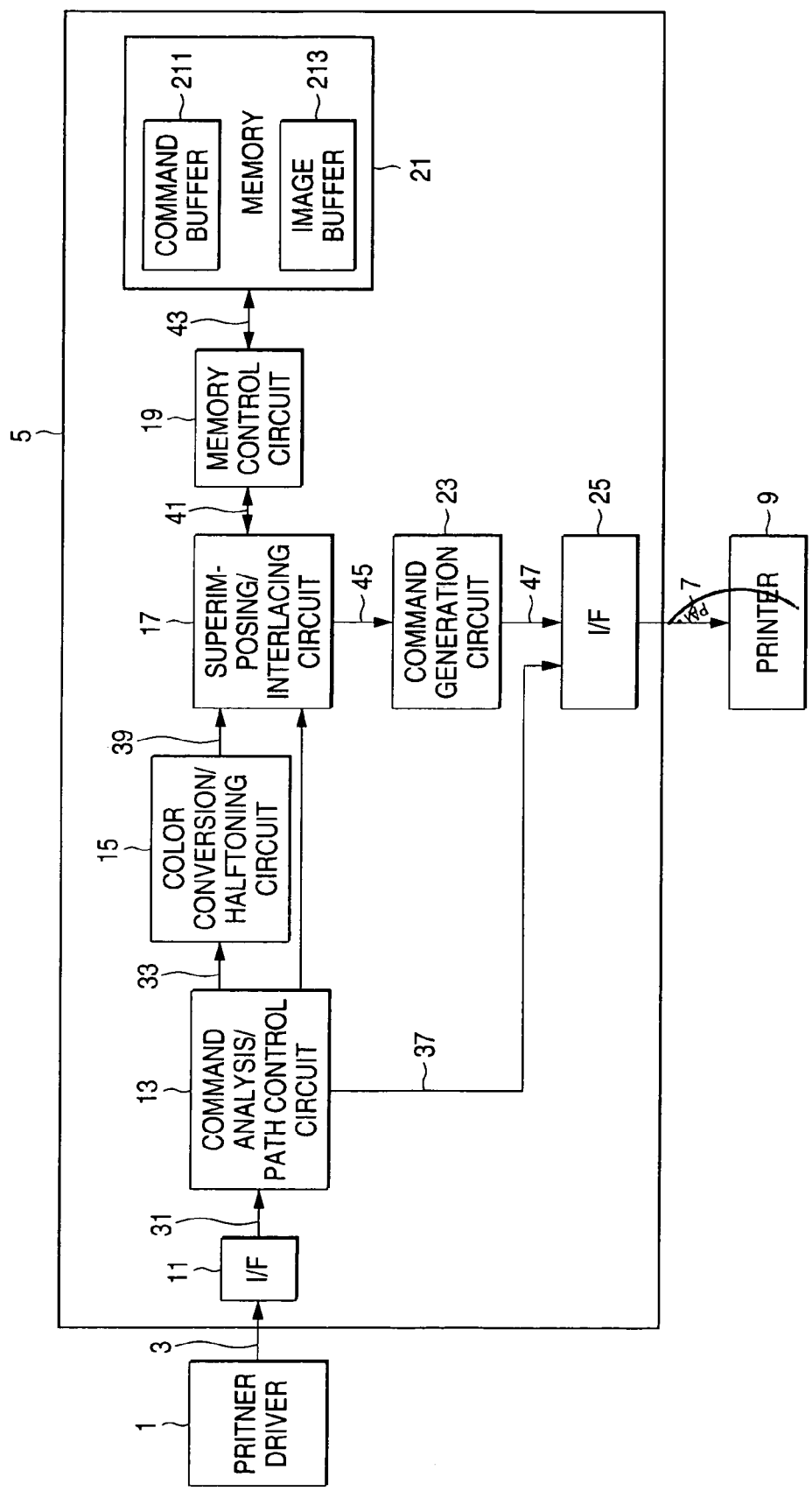
FIG. 1 is a diagram illustrating the general arrangement for one embodiment of the present invention.

FIG. 1 shows the general arrangement according to one embodiment of the present invention.

A dedicated printer control hardware circuit (hereinafter referred to as a control circuit) 5 is located between a printer driver 1, which is software that is stored in a host computer, and a printer 9. The control circuit 5 is a hardware logic circuit composed, for example, of an ASIC (Application Specified IC), and is not a computer with a CPU for executing software. The control circuit 5 receives a control circuit command 3 from the printer driver 1, and prepares a printer command 7 for the printer 9 and transmits it thereto.

Figure 2:
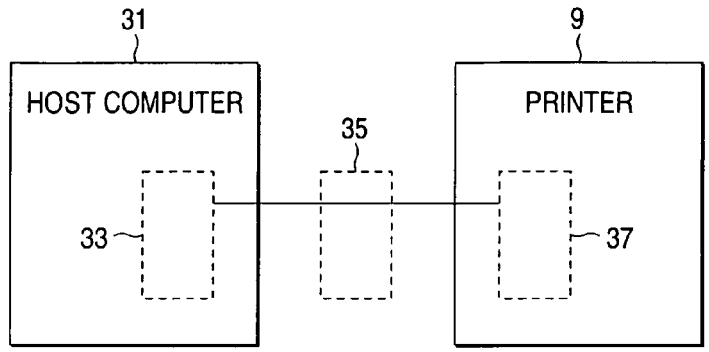
FIG. 2 is a diagram showing a variation for the location of a dedicated printer control circuit (control circuit) 5.

In FIG. 2, three variations are shown for the location of the control circuit 5: a block 33 in FIG. 2, where the control circuit 5 is incorporated in a computer 31; a block 37, where it is incorporated in the printer 9; and a block 35, where it is externally attached to the computer 31 and the printer 9. The host-incorporated control circuit 5 is provided as a host computer option board, which is connected to the internal bus of the host computer 31 and to the printer 9 by, for example, a parallel interface cable (or across a communication network). This type can cope with a plurality of printers. The printer-incorporated control circuit 5 is provided as a printer option board, which is connected to the internal bus of the printer 9 and is connected to the host computer 31 by, for example, a parallel interface cable (or a communication network). This type can cope with a plurality of host computers. And the externally-attached control circuit 5 is connected to both the host computer 31 and the printer 9 by, for example, a parallel interface cable (or via a communication network).

Generally, an image to be printed is divided into three different types of print data: "character," "graphic," and "illustration (a natural image)." The "character" data are characters or symbols that can be represented using character code, and the "graphic" data are primarily drawings or geometric images that can be represented using a function. The "illustration" data are primarily an image, specifically, a photograph or a picture, that is represented using raster data (i.e., a set of pixel values). In FIG. 1, when the printer driver 1 receives original image data from the OS of the host computer, the printer driver 1 extracts, from the original image data, separate data for characters/graphics and data for a natural image, and performs "rasterization," "color conversion" and "halftoning" for the character/graphic data changing them into low-resolution raster data of a printer display color type (specifically, binary CMYK raster data used to determine whether CMYK dots should be formed for individual pixels). The obtained low-resolution raster data are included in the control circuit command 3 and the resultant command is transmitted to the control circuit 5. The printer driver 1 does not perform "color conversion"

and "halftoning" of the illustration data, which are high-resolution raster data of a host display color type (specifically, full-color RGB raster data for an 8-bit byte with which the color components of the individual pixels can express 256 tones). The high-resolution raster data are included in the control circuit command 3, and the resultant command is transmitted to the control circuit 5. Therefore, the control circuit 5 performs "color conversion" and "halftoning" only for the photo RGB data.

There are two main reasons that the printer driver 1 performs "color conversion" and "halftoning" for characters/graphics, and the control circuit 5 performs such processing for the illustration: First, since the above process for characters/graphics generally does not impose a large load on the CPU but the process for the illustration does, for high-speed processing the most effective procedure is for the heavy load process to be controlled and executed by the control circuit 5, which is dedicated hardware, rather than the CPU. Second, although the character/graphic data must have a high resolution because outlines must be printed clearly, compared to the quantity of the high-resolution full-color RGB raster data, which is enormous, the quantity of the high-resolution binary CMYK raster data is not very large, so that only a short period of time is required to transfer the binary CMYK raster data from the printer driver 1 to the control circuit 5.

As is shown in FIG. 1, the control circuit 5 comprises: host interface circuit 11, a command analysis/path control circuit 13, a color conversion/halftoning circuit 15, a superimposing/interlacing circuit 17, a memory control circuit 19, a memory 21, a command generator 23, and a printer interface circuit 25. The host interface circuit 11 receives a series of control circuit commands 3 from the printer driver 1, and transmits them to the command analysis/path control circuit 13 as indicated by an arrow 31. Included in the series of commands are various commands, such as a command for designating various print conditions, a paper feeding command, a command for the transmission of the full-color RGB data for the photo, and a command for the transmission of the binary CMYK raster data for the characters/graphics. In the following explanation, a command for transmitting full-color RGB raster data for a photo is called an RGB raster command, a command for transmitting binary CMYK raster data for characters/graphics is called a CMYK raster command, and the general term used to describe both of the commands is image data command.

The command analysis/path control circuit 13 analyzes the received control circuit command 3, and extracts the command type. Basically, each command consists of a <command header> and <data>. Command code that indicates the command type and predetermined parameters, as needed, are included in the command header field. Data that correspond to the command type are included in the data field; for example, the print condition contents of a command for designating the print condition, binary CMYK raster data for characters/graphics for the CMYK raster command, or full-color RGB raster data for a photo for the RGB raster command. It should be noted that there is one command with which there is no accompanying <data>. Upon receipt of the thus structured command, the command analysis/path control circuit 13 identifies the command type from the <command header>.

When a received command is an RGB raster command, the command analysis/path control circuit 13 transmits for an illustration full-color RGB raster data, which constitute the <data> in the command, to the color conversion/halftoning circuit 15 as indicated by an arrow 33. When a received command is a CMYK raster command, the command analysis/path control circuit 13 transmits binary CMYK raster data for a character/graphic, which constitute the <data> in the command, to the superimposing/interlacing circuit 17 as indicated by an arrow 35. When a received command is other than an image data command (e.g., a command for designating a printing condition, or a paper feeding command), based on the command, the command analysis/path control circuit 13 sets the individual sections of the control command 5, as needed, or, if the printer 9 must be notified of the contents of the command, transmits the command to the superimposing/interlacing circuit 17, as is indicated by the arrow 35.

When the command analysis/path control circuit 13 receives a command that it can not identify, it transmits the command and all sequentially received information to the printer interface circuit 25, as is indicated by an arrow 37. It should be noted that such a case occurs when the printer driver 1 is an older version that is not compatible with the control circuit 5, and when a printer command that the control circuit 5 can not interpret is received. In this case, such a printer command is transmitted to the printer 9 via the printer interface circuit 25 (that is, a conventional process is performed for transmitting the printer command from the printer driver 1 to the printer 9).

The color conversion/halftoning circuit 15 performs color conversion and halftoning processing for the full-color RGB raster data received for the illustration from the circuit 13 to convert the data to binary CMYK raster data, which are thereafter transmitted to the superimposing/interlacing circuit 17 as indicated by an arrow 39.

As is described above, the superimposing/interlacing circuit 17 receives, from the command analysis/path control circuit 13, a command (e.g., a command for designating a print condition, or a paper feeding command) other than an image command, and the binary CMYK raster data for characters/graphics, and receives the photo binary CMYK raster data from the color conversion/halftoning circuit 15. The superimposing/interlacing circuit 17 transmits a command received from the command analysis/path control circuit 13 via the memory control circuit 19 and stores it in a command buffer 211 in the memory 21 as indicated by arrows 41 and 43. The superimposing/interlacing circuit 17 transmits, via the memory control circuit 19, the binary CMYK raster data for characters/graphics received from the command analysis/path control circuit 13 and the photo binary CMYK raster data received from the color conversion/halftoning circuit 15, and stores them in an image buffer 213 in the memory 21 as indicated by arrows 41 and 43. Before storing the binary CMYK raster data for the photo and for the character/graphic in the memory 21, the superimposing/interlacing circuit 17 designates a data writing address to the memory control circuit 19 so that the photo data and the character/graphic data for a corresponding pixel position be written at the same address in the memory 21. As a result, in the memory 21 are developed binary CMYK raster data for a complete image in which a photo image and a character/graphic image are superimposed (OR-operated).

In addition, when storing in the memory 21 the commands and binary CMYK raster data that are received, the superimposing/interlacing circuit 17 memorizes the order in which the commands and image data are stored. The superimposing/interlacing circuit 17 reads the commands and the superimposed binary CMYK raster data from the memory 21 via the memory control circuit 19 as indicated by arrows 41 and 43, and transmits them to the command generation circuit 23 as indicated by an arrow 45. If so-called interlace printing or so-called overlap printing is to be performed, the superimposing/interlacing circuit 17 changes the order of pixels or thins them out for the interlace printing or the overlap printing before transmitting to the command generation circuit 23 the binary CMYK raster data read from the memory 21.

As is described above, upon receiving an instruction from the superimposing/interlacing circuit 17, the memory control circuit 19 writes to and reads from the memory 21 the commands and the binary CMYK raster data as indicated by the arrow 43. The memory 21 is used as a buffer for temporarily storing the commands and the binary CMYK raster data, and includes the command buffer area 211 for storing commands and the image buffer area 213 for storing CMYK raster data. Furthermore, although not shown, the memory 21 also includes an area for registering data required for the interlace printing and the overlap printing.

The command generation circuit 23 receives, from the superimposing/interlacing circuit 17, the above described commands and the binary CMYK raster data for a complete image, converts the received data into a printer command 47 that the printer 9 can understand, and transmits the printer command 47 to the printer interface circuit 25. The printer interface circuit 25 transmits the printer command 47, which it receives from the command generation circuit 23, to the printer 9. Further, as described above, the printer interface circuit 25 also transmits the command from the command analysis/path control circuit 13 to the printer 9. The printer 9 then interprets the received printer command 7 and performs the printing.

With the above described arrangement, the printer driver 1 need only perform a light process for converting characters and graphics in an image to be printed into binary CMYK raster data, and the control circuit 5, which is pure hardware, performs a heavy process for converting a photo into binary CMYK raster data. Therefore, the host computer is not required to perform the heavy process. Furthermore, since the control circuit 5 superimposes the CMYK data for the characters/graphics and for the illustration to provide the complete image data, and transmits the data to the printer 9, the printer 9 is also not required to perform complicated image processing. In addition, since at the first stage characters or graphics that require a high resolution are converted by the printer driver 1 and the quantity of binary CMYK raster data that is thus obtained is not large, the time required for transferring data to the control circuit 5 at the following stage will not be extended. As a result, the last binary CMYK raster data can be quickly obtained, and high-speed printing is ensured. In addition, since the control circuit 5 using an ASIC can be manufactured at a low cost, the price of this system is lower than a system employing a conventional high-speed printer in which is mounted a fast CPU.

An explanation will now be given for the arrangement for the superimposing/interlacing circuit 17 of the control circuit 5 for writing into the memory 21 superimposed image data for the illustration and the characters/graphics.

As previously described, the color conversion/halftoning circuit 15 transmits to the superimposing/interlacing circuit 17, the binary CMYK raster data for the illustration, and the command analysis/path control circuit 13 transmits thereto the binary CMYK raster data for the characters/graphics. The circuits 15 and 13 output for each raster (for each line in the main image scanning direction) the binary CMYK raster data for the illustration and for the characters/graphics. The superimposing/interlacing circuit 17 receives raster data from the circuit that transmitted them earlier, i.e., either the color conversion/halftoning circuit 15 or the command analysis/path control circuit 13, and writes the raster data in the memory 21. During the writing of the raster data, the output of raster data from the other circuit is inhibited. Then when the data for one raster that are received either from the first circuit 13 or 15 have been written in the memory 21, data for the same raster are received from the other circuit and are superimposed and written in the memory 21.

Immediately after the color conversion/halftoning circuit 15 and the command analysis/path control circuit 13 have output raster data for one raster, they output an <eor> command that indicates the end of a raster. For a raster for which there are no raster data to be output, the color conversion/halftoning circuit 15 and the command analysis/path control circuit 13 output only the <eor> command. When the superimposing/interlacing circuit 17 receives <eor> commands from both circuits 13 and 15, it ascertains that one raster has been completed.

Figure 3:
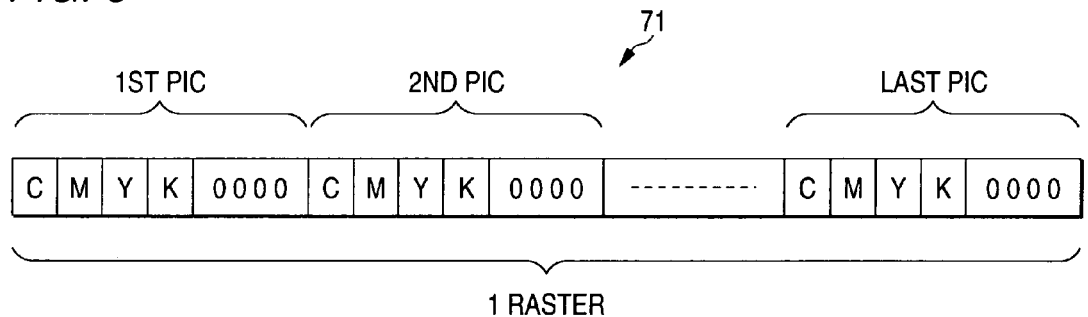
FIG. 3 is a diagram showing the structure of illustration CMYK raster data.
Figure 4:
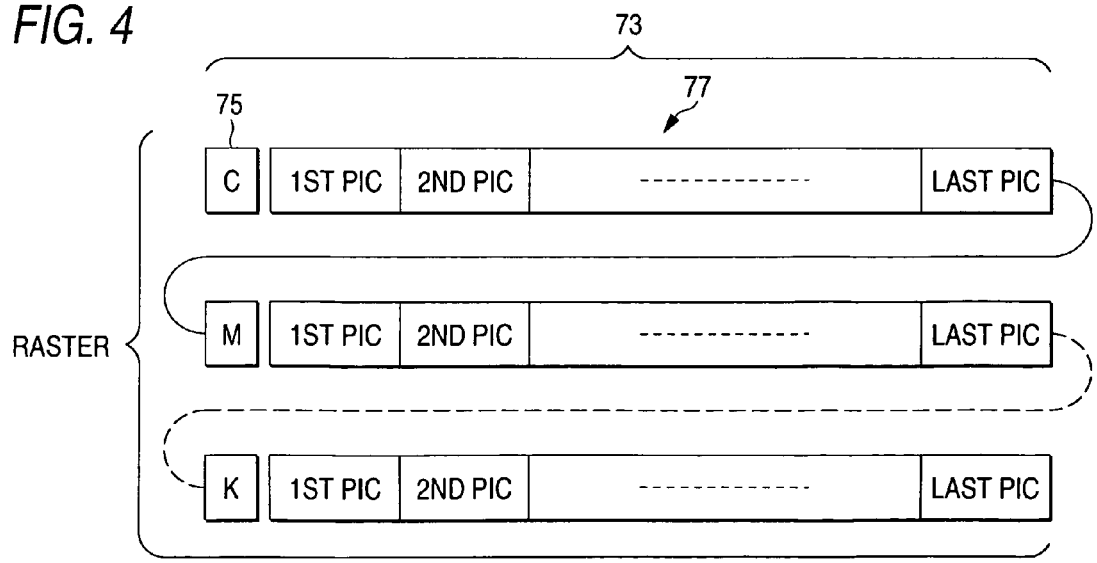
FIG. 4 is a diagram showing the structure of character/graphic CMYK raster data.

The form of data slightly differs between the illustration raster data produced by the color conversion/halftoning circuit 15 and the character/graphic raster data produced by the command analysis/path control circuit 13. As is shown in FIG. 3, in the illustration raster data, each byte 71 corresponds to a pixel (first PIC, second PIC, . . . ) in one raster, and the first four bits, for example, of each byte 71 designate the CMYK element for the pixel. On the other hand, as is shown in FIG. 4, the character/graphic raster data is divided into data strings 73 for individual CMYK colors, and each of the data strings 73 for individual CMYK colors consists of a color designation code 75 at the head and a succeeding bit string 77 that represents the pertinent color elements of the individual pixels (first PIC, second PIC, . . . ) in one raster.

Figure 5:
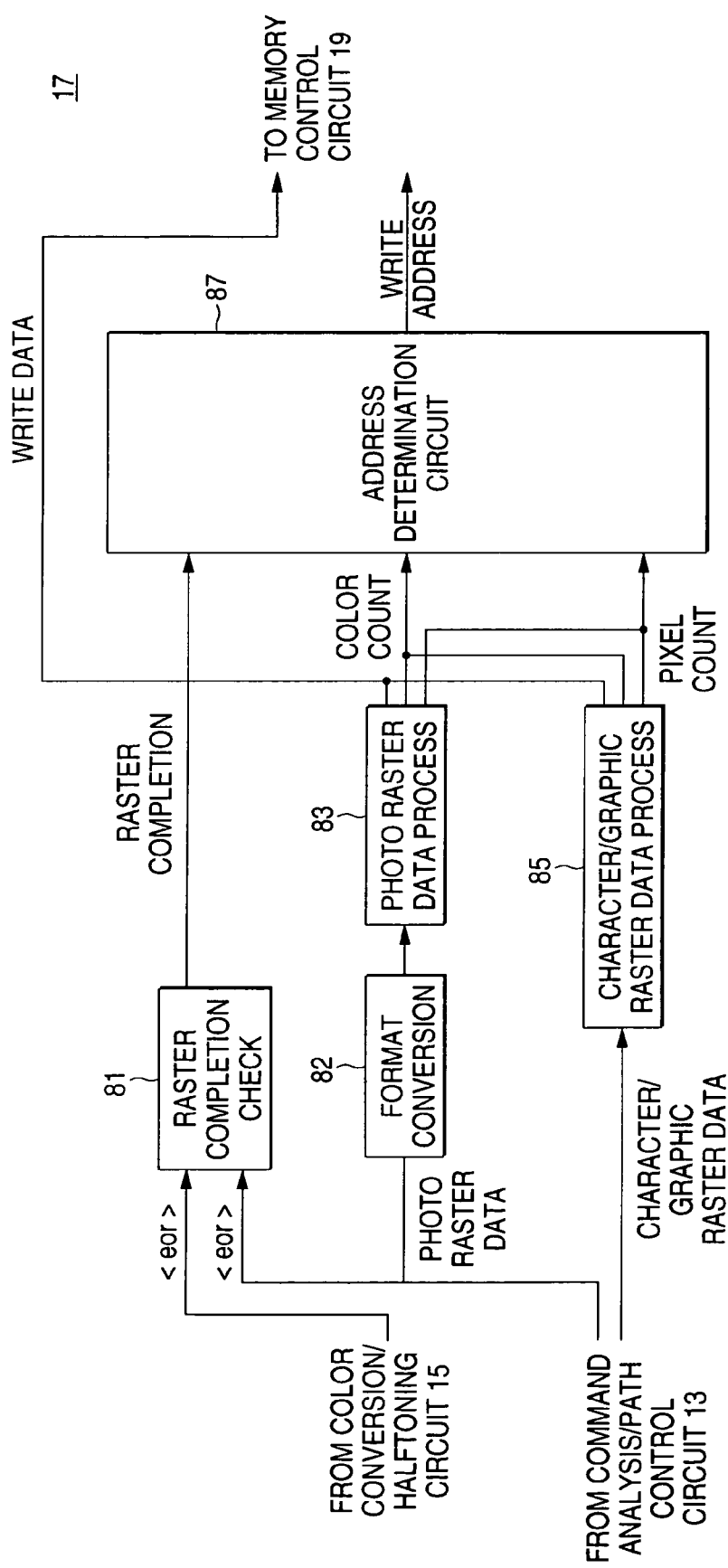
FIG. 5 is a diagram showing the circuit arrangement of a superimposing/interlacing circuit for writing CMYK raster data in a memory.

FIG. 5 shows a segment of the superimposing/interlacing circuit 17 for writing raster data in the memory 21.

In FIG. 5, as is described above, a raster completion check circuit 81 receives <eor> commands both from the color conversion/halftoning circuit 15 and from the command analysis/path control circuit 13, and then generates a raster completion signal and transmits it to an address determination circuit 87, which will be described later. A format conversion circuit 82 receives from the color conversion/halftoning circuit 15 illustration raster data having the pixel format shown in FIG. 3, and stores in internal shift registers (not shown) the CMYK color bits for the individual CMYK colors that are included in the pixel data that are received. When data for one word (e.g., 16 bits) have been accumulated in the shift registers, for an individual color a word equivalent to 16 pixels is extracted from the shift registers and is written to an illustration raster data processing circuit 83. At this time, words are written separately by color, for example, in the following order: a word for color C, a word for color M and a word for color Y. The illustration raster data processing circuit 83 receives from the format conversion circuit 82 the illustration raster data whose format has been converted into individual color words as described above, and upon each reception of a color word generates a color count signal that it transmits to the address determination circuit 87. Also, the illustration raster data circuit 83 outputs as write data to the memory control circuit 19 the words that are received, and generates a pixel count signal for each bit in each word and transmits the signal to the address determination circuit 87. A character/graphic raster data processing circuit 85 receives from the command analysis/path control circuit 13 the character/graphic raster data having the format shown in FIG. 4, and upon each reception of a color designation code 75 in a color data string 73 generates a color count signal that it transmits to the address determination circuit 87. Further, upon receiving the individual bits in the succeeding bit string 77, the character/graphic raster data processing circuit 85 transmits these bits as write data to the memory control circuit 19, and generates a pixel count signal that it transmits to the address determination circuit 87. It should be noted that one or the other of the illustration raster data processing circuit 83 and the character/graphic raster data processing circuit 85 is being operated at all times, and that the circuits 83 and 85 are not operated at the same time.

Figure 6:
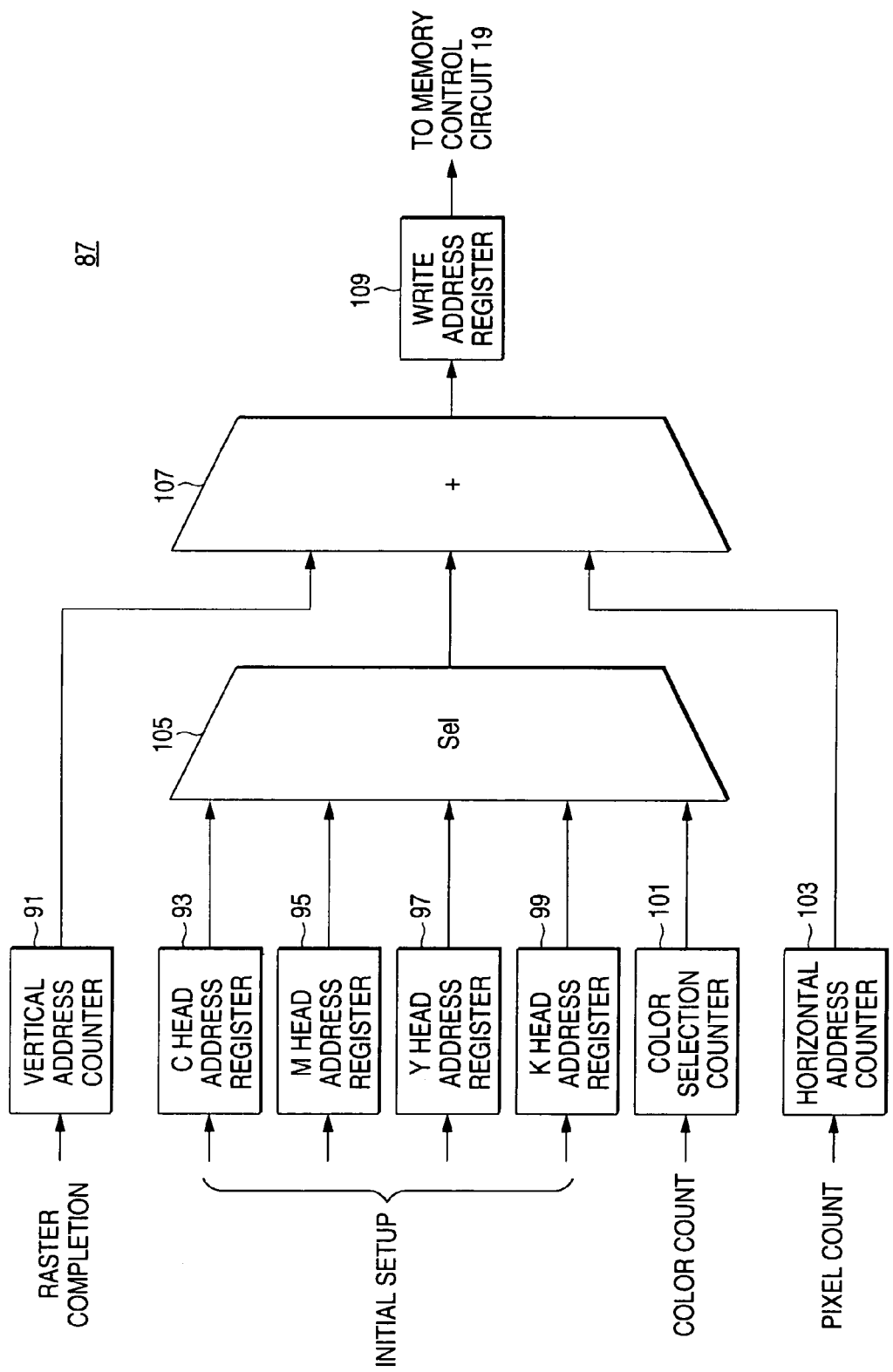
FIG. 6 is a diagram illustrating the arrangement of an address determination circuit in FIG. 5.

The address determination circuit 87, which has the arrangement shown in FIG. 6, determines at which address in the image buffer area 213 of the memory 21 data is to be written.

Figure 7:
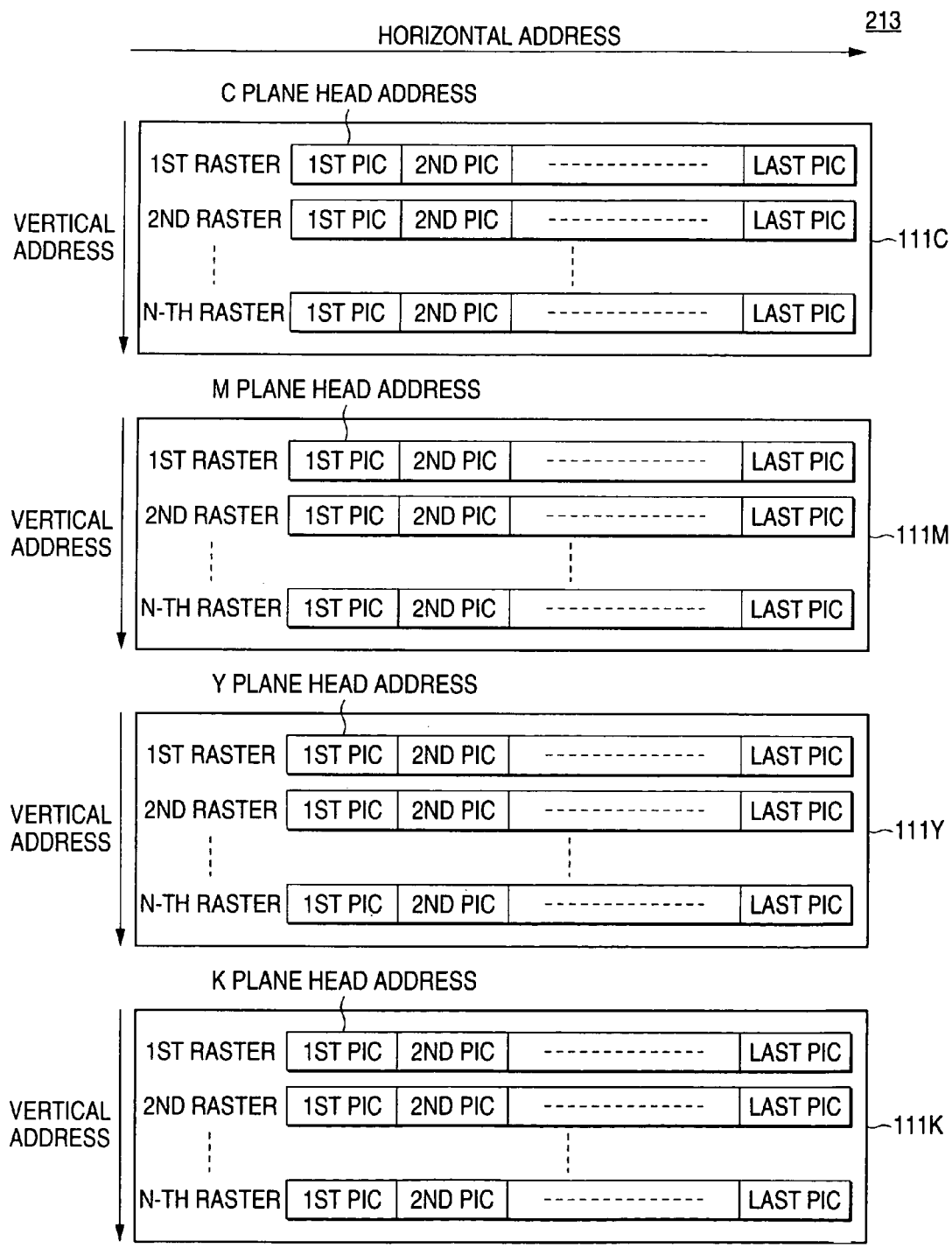
FIG. 7 a diagram showing color planes in a memory.

Before the explanation is given for the arrangement of the address determination circuit 87 in FIG. 6, the structure of the image buffer area 213 of the memory 21 will be explained while referring to FIG. 7. As is shown in FIG. 7, the image buffer area 213 of the memory 21 is divided into a C plane 111C, an M plane 111M, a Y plane 111Y, and a K plane 111K. The data for color elements for N rasters can be stored in the corresponding color planes 111C to 111K (the determination method for N will be described later). A head address is assigned for each of the color planes 111C to 111K so that the planes do not overlap each other. When the first raster in each color plane 111C to 111K is regarded as number 0, the numbers provided for individual rasters are called "vertical addresses," and when the first pixel (first PIC) in each raster is regarded as number 0, the numbers provided for the individual pixels are called "horizontal addresses." Therefore, an absolute address for each plane in the image buffer area 213 is defined as a set composed of a head address, a vertical address, and a horizontal address.

As is shown in FIG. 6, the address determination circuit 87 has three types of counters: a vertical address counter 91, a horizontal address counter 103, and a color selection counter 101. The vertical address counter 91 generates the above described vertical address, and increments the vertical address by one each time a raster completion signal is received from the raster completion check circuit 81 in FIG. 5. The horizontal address counter 103 generates the above described horizontal address, and increments the horizontal address by one each time a pixel count signal is received from the raster data processing circuits 83 and 85 in FIG. 5. The horizontal address counter 103 is initialized by the above described raster completion signal. The color selection counter 101 generates a color selection signal to select one of the four color planes in FIG. 4, and switches color selection signals upon receiving a color count signal from the raster data processing circuit 83 or 85 in FIG. 5. The color selection signal is transmitted to a selector 105.

The selector 105 is connected to four head address registers 93 to 99 in which the head addresses for the C, M, Y and K planes 111C to 111K are held. Upon receiving a color selection signal from the color selection counter 101, the selector 105 selects one of the four head address registers 93 to 99, and reads the head address from the selected head address register and outputs it. A synthesization circuit 107 generates a write address by combining the color plane head address received from the selector 105, the vertical address received from the vertical address counter 91 and the horizontal address received from the horizontal address counter 103, and registers it in a write address register 109. The write address that is registered in the write address register 109 is transmitted to the memory control circuit 19. The memory control circuit 19 writes, at the write address in the memory 21, the write data that are received from the raster data processing circuits 83 to 85 in FIG. 5. This writing process is effected by using new data to OR the data that are already present at the address.

The thus arranged address determination circuit 87 designates the same write address for data for the same pixel, regardless of whether an image is an illustration or characters/graphics. Therefore, the raster data for a complete image obtained by superimposing the illustration and the characters/graphics are developed in the memory 21. Although the formats for the data for the illustration and the characters/graphics differ, as is shown in FIGS. 3 and 4, the write address for both types of data is determined not by separate circuits but by the common address determination circuit 87, and a simplified and inexpensive control circuit 5 can be provided. For a raster for which there are no image data, only the <eor> commands are transferred, with no accompanying image data, and the vertical address is incremented by the two <eor> commands. Therefore, the same operation can be performed as is performed when writing null data in the memory 21 without actually accessing the memory 21, and this contributes to an increase in the processing speed.

The raster line ring buffer method can be used as the method for storing data in the image buffer area 213 in the memory 21. The capacity of the image buffer area 213 that is required for the ring buffer method is:

buffer capacity=N×the number of colors×horizontal resolution×paper width.

The number of colors is the number of coloring agents used by a printer, and in this embodiment, the four colors CMYK are employed. However, some printers have six or seven colors because light and heavy coloring agents are employed. The horizontal resolution is the raster data resolution in the horizontal direction (=main scanning direction or head scanning direction), and the paper width is the horizontal length of a printing sheet (measured by dots). The maximum value for the system is employed for the resolution and the paper size. N is the number of rasters that are required to be stored in the memory. Hereinafter a memory area in which data for one raster can be stored is regarded as one unit, and this unit is called a memory index. Therefore, N is the number of memory indexes in the image buffer area 213 in the memory 21, and N=(nozzle count−1)×path count+1+interlace paper feeding distance.

The nozzle specifically represents an ink-jet nozzle for an ink-jet printer. However, the nozzle is not limited to this, but also represents a dot forming component of a print head, such as an impact wire for an impact dot printer. The nozzle count is the number of nozzles that the printer head has for one color, and the path count is the number of rasters that are present between the adjacent nozzles. The interlace paper feeding distance is the distance at which paper is fed at one time for interlace printing (measured by dots). In short, memory index number N is the total number of rasters included in an area that the print head covers in the course of two scans. For example, when the nozzle count=5, the path count=4 and the interlace paper feeding distance=5, the memory index number N=22.

The operation for writing/reading raster data in or from the memory 21 will now be described while referring to FIGS. 8 and 9.

Figure 8:
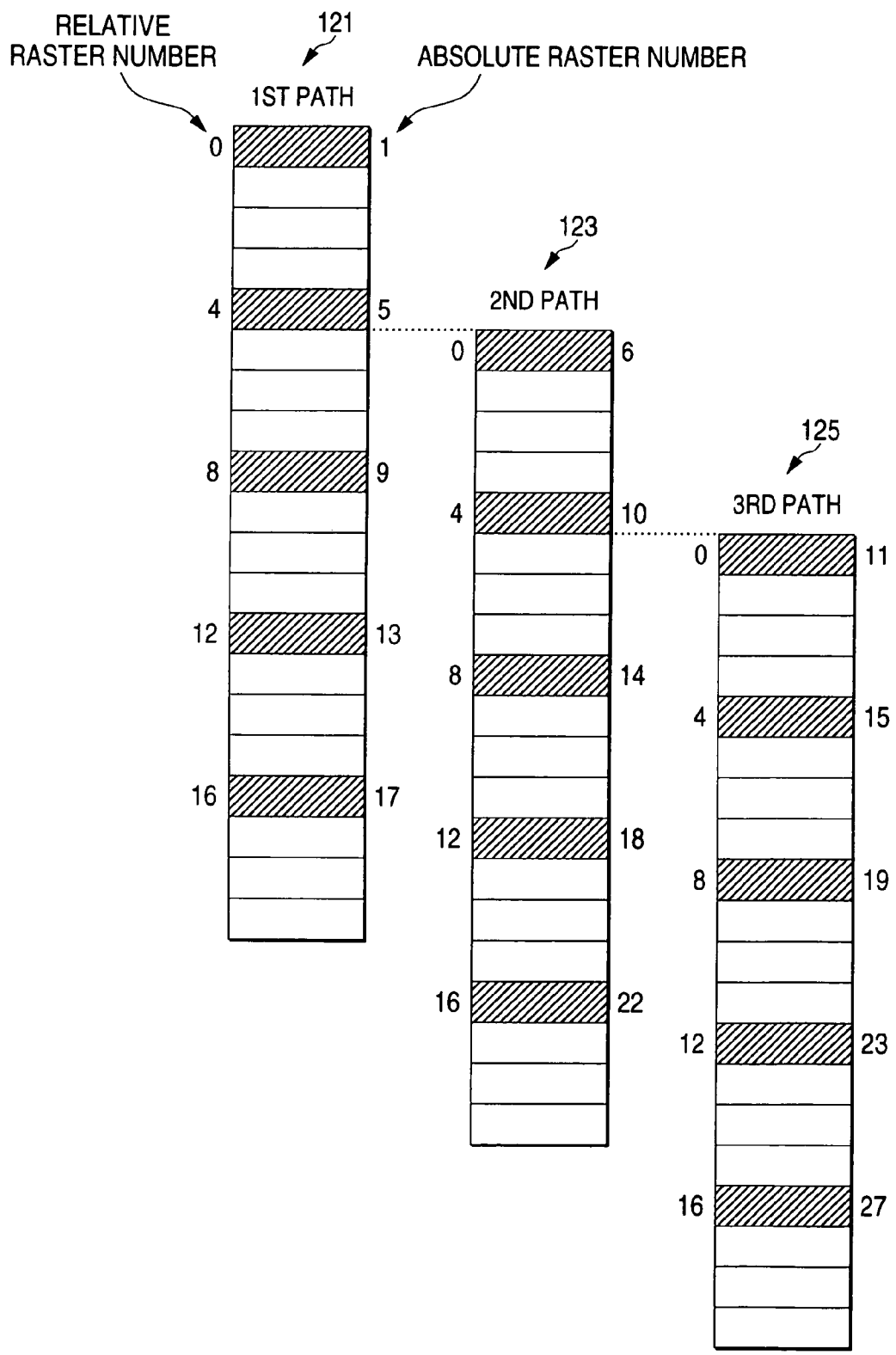
FIG. 8 is a diagram showing rasters printed at individual paths.

In FIG. 8 are shown rasters that are printed along the individual paths (head scans) when the nozzle count=5, the path count=4 and the interlace paper feeding distance=5 (the memory index number N=22, as in the above description). In a strip 121, rasters in a first path that are printed are represented as shaded portions, and rasters that are not printed are represented as blank portions. In the next strip 123 rasters in the second path that are printed and rasters that are not printed are represented in the same manner, and in a strip 125 obtained rasters in the third path are represented in the same manner. Relative raster numbers when a raster printed by the topmost nozzle of the print head is regarded as number 0 are given on the left sides of the strips 121, 123 and 125, and absolute raster numbers when the topmost raster on the paper is regarded as number 1 are provided on the right side. As is shown in FIG. 8, the 1st, 5th, 9th, 13th and 17th rasters are printed in the first path, the 6th, 10th, 14th, 18th and 22nd rasters are printed in the second path, and the 11th, 15th, 19th, 23rd and 27th rasters are printed in the third path.

FIG. 9 shows data for rasters to be written or read and 22 corresponding memory indexes in the memory 21. A table 131 represents the reading operation for raster data in the first path. The 1st to 17th raster data are written in the 0th to 16th memory indexes, and the data reading in the first path is initiated. First, the first raster data are read from the 0th memory index, which is the initial value held by a read pointer. Then, the read pointer is advanced by a path count=4 and the fifth raster data are read from the 4th memory index. Again, the read pointer is advanced by the path count=4 and the 9th raster data are read from the 8th memory index. In this manner, the read pointer is advanced by the path count=4 and the reading of raster data is repeated the number of times that is equivalent to the nozzle count=5, so that data for five rasters to be printed in the first path, i.e., the 1st, 5th, 9th, 13th and 17th rasters, are read sequentially. In parallel with the reading of data for the first path, a write pointer is advanced by one beginning at the 17th memory index that is pointed at by the write pointer, and raster writing is repeated the number of times that is equivalent to the interlace paper feeding distance=5. Then, data for the succeeding five rasters, up to the 22nd, that are required for the second path are written. As a result, when the data reading for the first path is completed, the data writing up to the raster required for the second path is also completed.

Following this, data are read for the second path as is shown in a table 133. For this processing, the read pointer is also advanced by the path count=4, and raster reading is repeated the number of times that is equivalent to nozzle count=5. Then, the five rasters, i.e., the 6th, 10th, 14th, 18th and 22nd rasters, are sequentially read from the 5th, 9th, 13th, 17th and 21st memory indexes. During the reading of data, the write pointer is advanced by one and the raster writing is repeated the number of times that is equivalent to the interlace paper feeding distance=5. As a result, data for the five remaining rasters up to the 27th raster that are required for the third path are written to the 0th to 4th indexes for which reading has been completed. Sequentially, as is shown in a table 135, as the pointer is operated in the same manner, data are read for the five rasters that are required for the third path, i.e., the 11th, 15th, 19th, 23rd and 27th rasters, and data are written for the five remaining rasters up to the 32nd that are required for the fourth path.

It should be noted that in the FOL, the POL, the upper end and the lower end processing, the reading and the writing of data can be performed by advancing the pointers a distance that is equivalent to the paper feeding distance.

Because of the above described ring buffer operation, only the smallest image buffer capacity, which is equivalent to 2 paths, is required, and this contributes to the reduction of cost.

Since the illustration and the characters/graphics must be superimposed for data writing, the above described writing operation for the memory 21 is performed in an OR write mode (an OR operation is performed with conventional data). Since the reading operation is performed in a clear read mode (clear immediately after reading), no problem arises even when new data obtained by an OR operation are written in a memory area for which reading has been completed. It should be noted that, for overlapping printing, since the reading of the same raster must be repeated a plurality of times, only the reading of the last data is performed in the clear read mode, the reading of the other data being performed in the normal read mode.

The embodiment of the present invention has been explained, but the present invention is not limited to this embodiment, and can be variously modified without departing from the scope of the invention. In the above embodiment, the control circuit 5 receives a control circuit command from the printer driver 1, and converts it into a printer command for transmission to the printer. However, image data may be exchanged with the host computer or the printer by a more direct method without employing a command. For example, a host computer incorporating a control circuit may directly receive image data for illustrations or for characters/graphics via the CPU bus of the host computer. And the printer-incorporating control circuit may transfer, directly to the print head of the printer, image data that are obtained by superimposing illustrations and characters/graphics.

What is claimed is:

1. A printer control circuit, which is a dedicated printer control hardware circuit disposed between an upper apparatus, which outputs high-resolution raster data for a first image element included in a print image and second low-resolution raster data for a second image element included in the print image, and a printer, the printer control circuit comprising:

a receiver for receiving the high-resolution raster data for the first image element and the low-resolution raster data for the second image element from the upper apparatus via an interface connected to the upper apparatus;

a halftoning circuit for performing a halftone process to convert the high-resolution raster data for the first image element received by the receiver into low-resolution raster data for the first image element; and an image completion circuit for obtaining low-resolution raster data for a complete print image based on the low-resolution raster data for the second image element received by the receiver and the low-resolution raster data for the first image element transmitted from said halftoning circuit.

2. A printer control circuit according to claim 1, wherein said first image element is an illustration, and said second image element constitutes characters and graphics.

3. A printer control circuit according to claim 1 or 2, wherein said high-resolution raster data for said first image element, which are transmitted from said upper apparatus, are expressed using an upper apparatus display color system that differs from a printer display color system that is employed by said printer; wherein said second low-resolution raster data for said second image element, which are transmitted from said upper apparatus, are expressed using said printer display color system; and wherein said halftoning circuit also performs color conversion for said high-resolution raster data for said first image element that are transmitted from said upper apparatus display color system to said printer display color system.

4. A printer control circuit according to claim 1, wherein for said low-resolution raster data for said complete print image said image completion circuit changes pixel order for interlaced printing.

5. A printer control apparatus according to claim 1, wherein a memory is provided for said image completion circuit, and wherein to obtain said low-resolution raster data for said complete print image said first low-resolution raster data for said first image element and said second low-resolution raster data for said second image element are superimposed and are written in said memory.

6. A printer control apparatus according to claim 5, wherein, when said image completion circuit is writing one of said first low-resolution raster data for said first image element and said second low-resolution raster data for said second image element, said image completion circuit holds the other of said first and second low-resolution raster image data that are to be written to said memory.

7. A printer control apparatus according to claim 5, wherein said high-resolution raster data for said first image element and said second low-resolution raster data for said second image element are sequentially transmitted by said upper apparatus; and wherein, when said image completion circuit recognizes that raster data both for said first and for said second image elements have been rasterized, said image completion circuit increments a vertical address for designating a location in said memory for writing said raster data, and superimposes and writes, at the same vertical address in said memory, said raster data for said first and said second image elements for the same raster.

8. A printer control apparatus according to claim 7, wherein, for a raster having said first image element or said second element not available, a raster end command for instructing raster termination of a pertinent image element is transmitted by said upper apparatus, and wherein, upon receiving said raster end command, said image completion circuit acknowledges said raster termination of said pertinent image element and obtains the same results without requiring null data for said pertinent image element that is being written in said memory.

9. A printer control apparatus according to claim 5, wherein, in order to develop said low-resolution raster data for said complete print image, said memory has a capacity that is large enough to store all the raster data in a range that is equivalent to one where the print head of said printer covers two paths; and wherein, while said image completion circuit reads raster data stored in said memory that said print head requires for the current path, said image completion circuit writes raster data in said memory until the last raster that said print head requires for the next path is reached.

10. A printer control apparatus according to claim 5, wherein said image completion circuit writes raster data to said memory in an OR write mode; and wherein said image completion circuit reads raster mode from said memory in a clear read mode during the last reading cycle for each raster, and in a normal read mode during a reading cycle other than the last reading cycle.

11. A printer control circuit according to claim 1, wherein the second low-resolution raster data for the second image element is generated by performing a halftone process in said upper apparatus.

12. A printer control circuit of claim 1, further comprising:
an upper apparatus interface for communicating with an upper apparatus; and
a printer interface for communicating with a printer.

13. A printer control circuit of claim 12, further comprising:
a command generation circuit which converts the low-resolution raster data for the complete print image into a printer command which is transmitted to the printer via said printer interface.

14. A printer for printing an image including a first image element and a second image element comprising:
a hardware circuit for processing image data including first high-resolution raster data for the first image element and low-resolution raster data for the second image element that are received from an upper apparatus, said hardware circuit including
a distributor which receives the image data from the upper apparatus and distributes the high-resolution raster data to a halftoning circuit and distributes the low-resolution raster data to an image completion circuit;
wherein the halftoning circuit performs halftoning for the high-resolution raster data for the first image element received from the distributor, obtains low-resolution raster data for the first image element, and transmits the obtained low-resolution raster data for the first image element to the image completion circuit; and
wherein the image completion circuit obtains low-resolution raster data for a complete print image based on the low-resolution raster data for the first image element received from the halftoning circuit and the low-resolution raster data for the second image element received from the distributor,
wherein printing is performed using said low-resolution raster data that are obtained by said hardware circuit for said complete print image.

15. A printer according to claim 14, wherein said first image element is an illustration, and said second image element constitutes characters and graphics.

16. A printer according to claim 14 or 15, wherein said high-resolution raster data for said first image element, which are transmitted from said upper apparatus, are expressed using an upper apparatus display color system that differs from a printer display color system that is employed by said printer; wherein said second low-resolution raster data for said second image element, which are transmitted from said upper apparatus, are expressed using said printer display color system; and wherein said halftoning circuit also performs color conversion for said high-resolution raster data for said first image element that are transmitted from said upper apparatus display color system to said printer display color system.

17. A printer according to claim 14, wherein for said low-resolution raster data for said complete print image said image completion circuit changes pixel order for interlaced printing.

18. A printer according to claim 14, wherein a memory is provided for said image completion circuit, and wherein to obtain said low-resolution raster data for said complete print image said first low-resolution raster data for said first image element and said second low-resolution raster data for said second image element are superimposed and are written in said memory.

19. A printer according to claim 18, wherein, when said image completion circuit is writing one of said first low-resolution raster data for said first image element and said second low-resolution raster data for said second image element, said image completion circuit holds the other of said first and second low-resolution raster image data that are to be written to said memory.

20. A printer according to claim 18, wherein said high-resolution raster data for said first image element and said second low-resolution raster data for said second image element are sequentially transmitted by said upper apparatus; and wherein, when said image completion circuit recognizes that raster data both for said first and for said second image elements have been rasterized, said image completion circuit increments a vertical address for designating a location in said memory for writing said raster data, and superimposes and writes, at the same vertical address in said memory, said raster data for said first and said second image elements for the same raster.

21. A printer according to claim 20, wherein, for a raster having said first image element or said second element not available, a raster end command for instructing raster termination of a pertinent image element is transmitted by said upper apparatus, and wherein, upon receiving said raster end command, said image completion circuit acknowledges said raster termination of said pertinent image element and obtains the same results without requiring null data for said pertinent image element that is being written in said memory.

22. A printer according to claim 18, wherein, in order to develop said low-resolution raster data for said complete print image, said memory has a capacity that is large enough to store all the raster data in a range that is equivalent to one where the print head of said printer covers two paths; and wherein, while said image completion circuit reads raster data stored in said memory that said print head requires for the current path, said image completion circuit writes raster data in said memory until the last raster that said print head requires for the next path is reached.

23. A printer according to claim 18, wherein said image completion circuit writes raster data to said memory in an OR write mode; and wherein said image completion circuit reads raster mode from said memory in a clear read mode during the last reading cycle for each raster, and in a normal read mode during reading cycle other than the last reading cycle.

24. A printer according to claim 14, wherein the second low-resolution raster data for the second image element is generated by performing a halftone process in said upper apparatus.

25. A printer, comprising:
  a receiving circuit that receives transmitted data from an upper apparatus, wherein the transmitted data includes high-resolution raster data for a first image element of an image and first low-resolution raster data for a second image element of the image; and
  a control circuit, wherein the control circuit performs a halftoning operation for the high-resolution raster data and obtains second low-resolution raster data for the first image element based on the halftoning operation, and
  wherein the control circuit obtains low-resolution raster data for the image based on the first low-resolution raster data and the second low-resolution raster data.

26. The printer as claimed in claim 25, wherein the transmitted data further comprises identifying data that identifies a data type of the transmitted data.

27. The printer as claimed in claim 26, wherein the control circuit analyzes the identifying data and determines the data type of the transmitted data based on the identifying data.

* * * * *